United States Patent [19]
Crucq et al.

[11] Patent Number: 5,612,583
[45] Date of Patent: Mar. 18, 1997

[54] ELECTRIC MOTOR AND APPARATUS COMPRISING THE ELECTRIC MOTOR

[75] Inventors: Jacobus Crucq, Eindhoven; Paulus A. A. Kootwijk, Utrecht, both of Netherlands

[73] Assignee: U.S. Philips Corporation, New York, N.Y.

[21] Appl. No.: 146,282

[22] Filed: Oct. 28, 1993

[30] Foreign Application Priority Data

Oct. 30, 1992 [EP] European Pat. Off. .............. 92203345

[51] Int. Cl.⁶ ............................................. H02K 5/16
[52] U.S. Cl. ............................... 310/90; 310/51; 310/91; 310/273; 384/220; 384/535; 384/536; 384/582
[58] Field of Search ............................. 310/51, 90, 91, 310/273; 384/535, 536, 581, 582

[56] References Cited

U.S. PATENT DOCUMENTS

| | | | |
|---|---|---|---|
| 2,874,008 | 2/1959 | Orte et al. | 308/184 |
| 3,568,962 | 3/1971 | Janssen | 248/15 |
| 3,717,779 | 2/1973 | Hallerback | 310/91 |
| 3,759,626 | 9/1973 | Becker | 415/90 |
| 4,472,650 | 9/1984 | Advolotkin et al. | 310/156 |
| 4,872,767 | 10/1989 | Knapp | 384/99 |
| 4,900,165 | 2/1990 | Kun et al. | 384/220 |

FOREIGN PATENT DOCUMENTS

| | | |
|---|---|---|
| 1320919 | 2/1963 | France . |
| 1140277 | 8/1962 | Germany . |
| 1141019 | 12/1962 | Germany . |

*Primary Examiner*—Thomas M. Dougherty
*Assistant Examiner*—Elvin G. Enad
*Attorney, Agent, or Firm*—Ernestine C. Bartlett

[57] ABSTRACT

An electric motor (1) has a stator (3) and a rotor (5) having a rotor shaft (7), which rotor shaft is supported relative to the stator by means of ball-bearings (9). The ball-bearings are connected directly to suspension elements (11) for the suspension of the electric motor (1) relative to an external device. Resilient elements (13) are arranged between the suspension elements (11) and the stator (3) to suppress vibrations in the suspension elements (11). When the electric motor (1) is used in an apparatus less vibrations are transmitted to the frame of the apparatus, so that the apparatus itself also produces less vibrations and less noise.

7 Claims, 2 Drawing Sheets

ELECTRIC MOTOR AND APPARATUS COMPRISING THE ELECTRIC MOTOR

FIELD OF THE INVENTION

The invention relates to an electric motor comprising a rotor shaft, a stator, at least one suspension element for securing the electric motor to an external device, a bearing arrangement supporting the rotor shaft relative to the stator, and means for suppressing vibrations in the suspension element. In the suspension element vibrations are produced by magnetic forces in the air gap between the rotor and the stator, which forces vary in magnitude because the air gap is not uniform owing to the inevitable presence of rotor and stator slots or owing to an eccentric rotation of the rotor. As a result of this, both the rotor and the stator are subjected to radial forces of equal magnitude but of opposite direction. The spring characteristics of parts of the electric motor between the rotor and the stator, inter alia the flexural strength of the rotor shaft and the bearing stiffness, the rotor and the stator will vibrate radially in phase opposition. These vibrations produce noise and are transmitted to the environment via the suspension.

BACKGROUND OF THE INVENTION

An electric motor of the type defined in the opening sentence is known from DE-PS 11 40 277 (herewith incorporated by reference). In the known motor the vibrations in the suspension are reduced by arranging a damping element between the rotor shaft bearing and the suspension. This yields a construction in which the suspension is situated in a zero-vibration point, i.e. the points which are stationary relative to the surrounding and consequently do not vibrate. These damping elements are compliant relative to the other parts of the electric motor. As a result, the vibration characteristics of this electric motor have large amplitudes, so that the positions of these parts vary considerably, which is particularly undesirable for the rotor shaft, which is coupled to parts to be driven.

SUMMARY OF THE INVENTION

An object of the invention to provide an electric motor of the type defined in the opening sentence, in which the means for suppressing vibrations in the suspension element do not adversely affect the position of the rotor shaft. To this end the electric motor in accordance with the invention is characterized in that the suspension element is connected directly to the bearing arrangement and the means in essence have resilient properties and comprise at least one resilient element connecting the suspension element to the stator. Since the suspension element is connected directly to the bearing arrangement the means for suppressing vibrations in the suspension element cannot adversely affect the position of the rotor shaft. Directly connecting the suspension element to the bearing arrangement and yet suppressing vibrations in the suspension element is possible by arranging an element having almost exclusively resilient properties between the suspension element and the stator. This will be explained later with reference to the Figures. Another advantage of this construction is that a substantial noise reduction is obtained. The stiffness of the resilient element is substantially rotationally symmetric, i.e. of at least substantially equal magnitude in any radial direction.

An embodiment of the electric motor in accordance with the invention is characterized in that the ratio of the stiffness $K_a$ of the rotor shaft and the bearing arrangement to the stiffness $K_b$ of the resilient element is equal to the ratio of the stator mass $M_s$ to the rotor mass $M_r$: $K_a/K_b = M_s/M_r$. If this is complied with the vibrations in the suspension element can be reduced to zero.

A preferred embodiment of the electric motor in accordance with the invention is characterized in that the resilient element is formed by two concentric coplanar circular rings interconnected by integral hinges, one of the rings being connected directly to the suspension element and the other ring being connected to the stator. This resilient element can be manufactured from a disc by means of simple operations.

The invention further relates to an apparatus comprising an electric motor in accordance with the invention, the suspension element being secured to a frame of the apparatus. An apparatus using the electric motor in accordance with the invention produces less or no vibrations caused by the electric motor and, as a consequence, such apparatus also produces less noise.

BRIEF DESCRIPTION OF THE DRAWINGS

The invention will now be described in more detail, by way of example, with reference to the drawings. In the drawings.

DETAILED DESCRIPTION OF THE PREFERRED EMBODIMENTS

Figure 1:
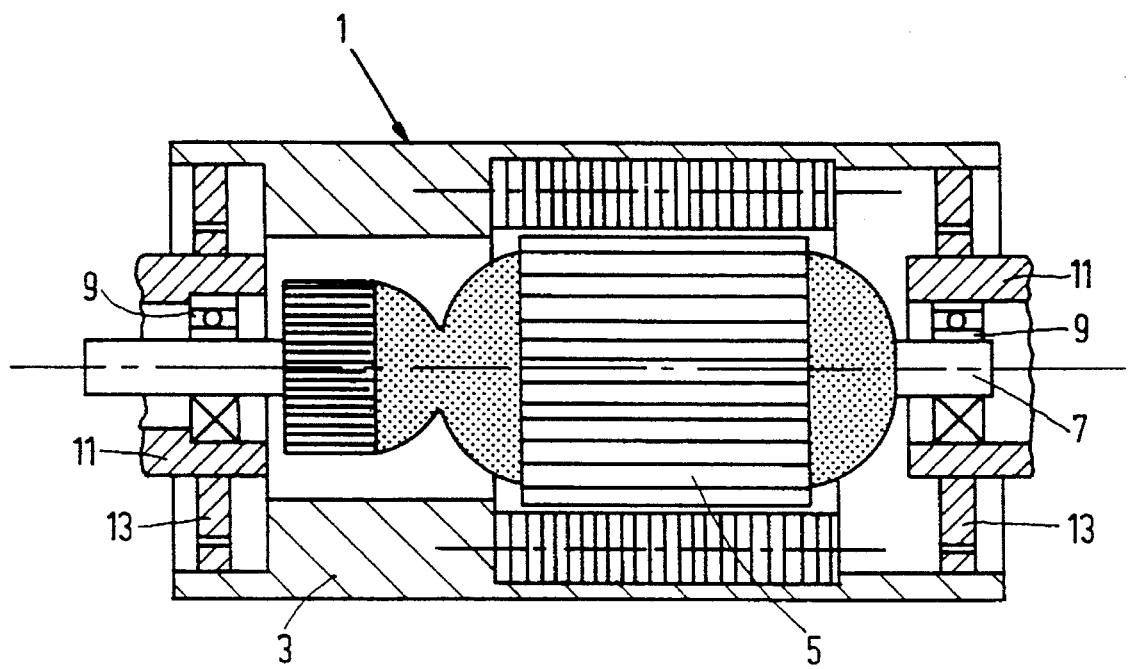
FIG. 1 shows a sectional view of the electric motor in accordance with the invention.

FIG. 1 is a sectional view of the electric motor 1 in accordance with the invention. The electric motor comprises a stator 3 and a rotor 5 having a rotor shaft 7. The rotor shaft is supported relative to the stator by means of a bearing arrangement comprising ball-bearings 9. The ball-bearings are connected directly to suspension elements formed by sleeves 11. These sleeves are secured to an external device, such as for example a housing of a vacuum cleaner (not shown). Means for suppressing vibrations in the suspension elements are arranged between the sleeves 11 and the stator 3. These means comprise resilient elements 13 connecting the suspension elements to the stator. If the electric motor is connected to an external device at one side only a suspension element and a resilient element as shown here can be arranged at only one side of the electric motor. At the other side the ball-bearing can then be connected to the stator directly or via a cover.

Figure 2:
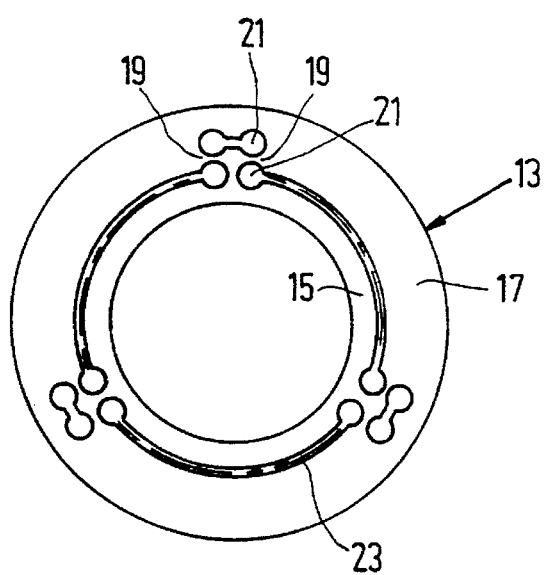
FIG. 2 shows an example of a resilient element.

FIG. 2 shows one of the resilient elements 13 formed by two concentric coplanar circular rings 15, 17 interconnected by integral hinges 19. The integral hinges 19 are constituted by bridge portions formed after holes 21 have been made in a disc from which the resilient element is manufactured. The two rings 15, 17 are obtained in that the disc is formed with a circular slot which is interrupted at some locations for the interconnection of the two rings. Instead of this integral resilient element it is possible to arrange a plurality of separate resilient elements, for example formed by plastic blocks, between the suspension element and the stator. Moreover, instead of one suspension element at each side, it is possible to provide several suspension elements between the resilient elements and the ball-bearing. These suspension elements may be formed, for example, by blocks having a bore or a threaded portion to secure the electric motor to an external device.

To illustrate the effect of the presence of the resilient elements two electric motors will now be compared with one another, one with resilient elements and one without resilient elements.

Figure 3:
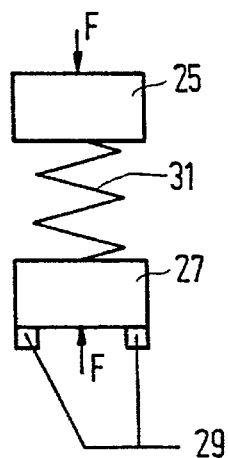
FIG. 3 shows diagrammatically the mass-spring system of a known electric motor without means for suppressing vibrations in the suspension elements.

The mass-spring system of the electric motor shown in FIG. 1 is shown in FIG. 3 without the resilient elements. The suspension elements are connected to the stator directly or via a cover. The mass $M_r$ of the rotor is represented diagrammatically by the rectangle 25 and the mass $M_s$ of the stator by the rectangle 27. The masses of the suspension elements are represented as squares 29 and are connected directly to the stator mass. The spring stiffnesses of the parts of the electric motor between the rotor and the stator, inter alia the flexural strength of the rotor shaft and the bearing stiffness, are represented diagrammatically as a spring 31 of a stiffness $K_a$. The magnetic forces in the air gap between the rotor and the stator produce radial forces both on the rotor and the stator, which excite the mass-spring system. These excitation forces F are represented as arrows.

Figure 4:
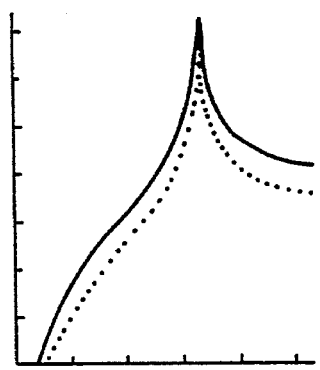
FIG. 4 is a graph illustrating the excursion of the rotor and the stator as a function of the frequency for the known electric motor shown in FIG. 3.

FIG. 4 is a graph showing the amplitude of the excursion of the rotor (solid line) and the stator with the suspension elements (dashed line) as a function of the frequency of the excitation force F relating to the mass-spring system shown in FIG. 3.

Figure 5:
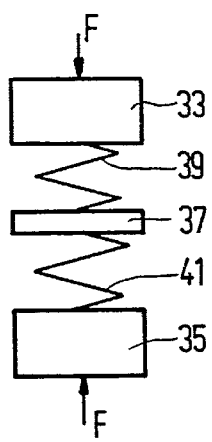
FIG. 5 shows diagrammatically the mass-spring system of the electric motor in accordance with the invention.

The mass-spring system of the electric motor shown in FIG. 1 provided with the resilient elements is shown in FIG. 5. The suspension elements are connected to the stator via the resilient elements. The mass $M_r$ of the rotor is represented diagrammatically by the rectangle 33 and the mass $M_s$ of the stator by the rectangle 35. The masses of the suspension elements are represented by the bar 37. The sum of the spring stiffnesses of the parts of the electric motor between the rotor and the stator are represented diagrammatically as a spring 39 of a stiffness $K_a$. The spring stiffnesses of the resilient elements are represented diagrammatically as a spring 41 of a stiffness $K_b$.

Figure 6:
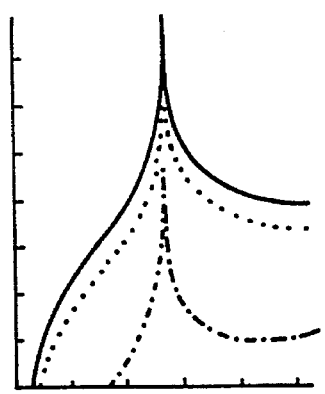
FIG. 6 is a graph illustrating the excursion of the rotor, the stator and the suspension elements as a function of the frequency for the electric motor shown in FIG. 5.

FIG. 6 is a graph showing the amplitude of the excursion of the rotor (solid line), the stator (dashed line) and the suspension elements (dash-dot line) as a function of the frequency of the excitation force F relating to the mass-spring system shown in FIG. 5. It is apparent that the suspension elements of the electric motor in accordance with the invention have smaller excursions than those of the electric motor without resilient elements. The excursions of the suspension elements can be reduced to zero by making the ratio of the sum $K_a$ of the stiffnesses of the parts of the electric motor between the rotor and the suspension elements to the stiffness $K_b$ of the resilient elements equal to the ratio of the stator mass $M_s$ to the rotor mass $M_r$: $K_a/K_b = M_s/M_r$. This makes it possible to suppress vibrations in the suspension elements of any existing electric motor by arranging resilient elements between the stator and the suspension elements without any further adaptations to the electric motor being necessary.

We claim:

1. An electric motor comprising a rotor shaft, a stator, at least one suspension element for securing the electric motor to an external device, means comprising a ball bearing supporting the rotor shaft relative to the stator, and means for suppressing vibrations in the suspension element, wherein at least one suspension element is secured to a device that is external to the electric motor, and is connected directly to a ball bearing, and wherein said means for suppressing vibrations in the suspension element have resilient properties and comprise at least one resilient element connecting the suspension element to the stator.

2. The electric motor as claimed in claim 1, wherein the rotor shaft and the bearing arrangement have a stiffness Ka, the resilient element has a stiffness Kb and the ratio of the stiffness $K_a$ of the rotor shaft and the bearing arrangement to the stiffness $K_b$ of the resilient element is equal to the ratio of the stator mass $M_s$ to the rotor mass $M_r$: $K_a/K_b = M_s/M_r$.

3. An apparatus comprising an electric motor as claimed in claim 2 wherein the suspension element is secured to a frame of an apparatus.

4. An apparatus comprising an electric motor as claimed in any one of the preceding claims, the suspension element being secured to a frame of an apparatus.

5. An electric motor comprising a rotor shaft, a stator, at least one suspension element for securing the electric motor to an external device, means comprising a ball bearing supporting the rotor shaft relative to the stator, and means for suppressing vibrations in the suspension element, wherein at least one suspension element is secured to a device that is external to the electric motor, and is connected directly to a ball bearing, and wherein said means for suppressing vibrations in the suspension element have resilient properties and comprise at least one resilient element formed by two concentric coplanar circular rings interconnected by integral hinges, one of the rings being connected directly to the suspension element and the other ring being connected to the stator.

6. An apparatus comprising an electric motor as claimed in claim 5 wherein the suspension element is secured to a frame of an apparatus.

7. An electric motor comprising a rotor shaft, a stator, at least one suspension element for securing the electric motor to an external device, means comprising at least one ball bearing supporting the rotor shaft relative to the stator, and means for suppressing vibrations in the suspension element, wherein at least one suspension element is secured to a device external to the electric motor, and is connected directly to a ball bearing, and wherein said means for suppressing vibrations in the suspension element have resilient properties and comprise at least one resilient element formed by two concentric coplanar circular rings interconnected by integral hinges, one of the rings being connected directly to the suspension element and the other ring being connected to the stator; and wherein the rotor shaft and the bearing arrangement have a stiffness $K_a$, the resilient element has a stiffness $K_b$, and the ratio of the stiffness $K_a$ of the rotor shaft and the bearing arrangement to the stiffness $K_b$ of the resilient element is equal to the ratio of the stator mass $M_s$ to the rotor mass $M_r$: $K_a/K_b = M_s/M_r$.

\* \* \* \* \*